METHOD AND MEANS FOR RECORDING AND REPRODUCING MAGNETOGRAMS

Filed Dec. 9, 1959

2 Sheets-Sheet 1

Aug. 10, 1965 E. RAINER ETAL 3,200,207

METHOD AND MEANS FOR RECORDING AND REPRODUCING MAGNETOGRAMS

Filed Dec. 9, 1959 2 Sheets-Sheet 2

United States Patent Office 3,200,207

Patented Aug. 10, 1965

3,200,207

METHOD AND MEANS FOR RECORDING AND REPRODUCING MAGNETOGRAMS

Erich Rainer, Erlangen, and Christian-Friedrich Wolf and Walter Engel, Nurnberg, Germany, assignors to Siemens - Schuckertwerke Aktiengesellschaft, Berlin - Siemensstadt, Germany, and Erlangen, Germany, a corporation of Germany Filed Dec. 9, 1959, Ser. No. 858,377

Claims priority, application Germany, Dec. 12, 1958, S 60,965

11 Claims. (Cl. 179—100.2)

Our invention relates to a method and means for recording and reproducing magnetograms and is preferably applicable to sound tracks and other magnetic signals recorded on tape, although the invention also applies to recording discs, foils and belts, preferably of the types which consist of synthetic plastic and have magnetizable particles coated upon, or embedded in, the plastic material. However, the invention also relates to wires or other signal carriers consisting throughout of magnetizable material.

It has become known to reproduce magnetograms by means of transducer heads that are provided with one or more Hall-voltage generating devices. The use of such devices has the advantage that the generated pickup voltages are independent of the travelling speed of the magnetogram relative to the transducer head, so that signals can be reproduced, if desired, from a discontinuously or incrementally travelling tape, or when the tape or other magnetogram carrier is at standstill. Another advantage is the obtainable high sensitivity, particularly in cases where the Hall plate of the transducer head is located in the active gap facing the magnetogram, and preferably in the immediate vicinity of the magnetogram. The Hall plate of such a device can be given extremely small thickness, for example by vaporizing semiconductor material upon a gap surface of the appertaining magnetizable structure. The active gap width of the transducer can thus be made very narrow, so that the upper limit frequency of the recorded alternating-flux signals can be kept extremely high. Consequently the frequency range of the reproduced signals can be greatly expanded and/or the magnetogram carrier can be operated with a smaller travelling speed for a given frequency range of reproduction.

When reproducing alternating-flux signals from a magnetogram carried by means of a transducer operating on the Hall-voltage generator principle, the transducer output voltage may comprise a direct-current component which heretofore lacked utility but was filtered out because irrelevant for the subsequent amplification of the reproduced signals.

It is an object of our invention to render the applicability of magnetograms more versatile and to utilize a carrier of a given surface or track width to a greater extent, by superimposing an additional track of magnetic signals.

Another object of our invention is to make a magnetic recording tape or other magnetogram carrier suitable for transmitting not only the sound track or other main signals to be recorded and reproduced, but to also transmit auxiliary control signals, such as synchronizing signals, as may be useful for effecting a control in a given time relation to the sound track or main signals being transmitted.

To achieve these, as well as the more specific objects and advantages mentioned below, and in accordance with one of the features of our invention, we utilize the above-mentioned direct-flux component of the recorded signals, or we provide the magnetogram with additional direct-flux recordings, and we employ the direct-voltage component of the reproducing transducer voltage, in dependence upon its magnitude and/or direction, for controlling, regulating or other auxiliary purposes, in addition to the simultaneous transmission of the sound track or other main signals being reproduced.

There are several ways, according to the invention, of providing a magnetogram carrier with direct-flux signals in addition to the track of main signals. One way is to record the direct-flux signals on a separate track of the magnetogram carrier. Another way is to superimpose the direct-flux signals upon the track of the main signals. In each case the direct-flux signals according to the invention may consist of individual areas of magnetization extending longitudinally or transversely within the plane or surface of the carrier, or the auxiliary signals may extend in depth, i.e., in the direction of the carrier thickness. In principle, the auxiliary signals may have a frequency within the normal frequency range of main-signal transmission. However, the auxiliary signals, provided and utilized according to the invention, are mainly of significance below the frequency range that can be reproduced conventionally by electromagnetic induction.

The significance of a direct-voltage component in the transducer voltage resulting from the reproduction of magnetically recorded signals, and the utilization of such direct-voltage components according to the invention, will be more fully understood from the following. Assume that a true alternating-current signal is recorded on a magnetic tape. Then the direct-voltage median value of the recorded signals, as manifested by the output voltage of a reproducing transducer, is zero. Now, the present invention requires embodying in the recorded signals a direct-flux component in addition to the alternating-flux main signals. This can be done for example, by superimposing in the recording transducer a direct voltage upon an alternating voltage or vice versa, so that the resultant recorded signal corresponds to a pulsating direct voltage. Magnetically, this is tantamount to having in the recorded signals a predominant flux component in one or the other direction of magnetic polarization.

In cases where the main signals to be recorded on a magnetogram carrier include a high-frequency premagnetization, such premagnetization can also be retained for recording the additional control signals in accordance with the present invention. However, while heretofore the alternating-current signal manifested itself merely as a magnetic superposition upon, or modulation of, the high-frequency magnetization, care must be taken for the purposes of the present invention of combining the alternating-current signal with a suitable direct-current component in such a manner that the median flux value of the recordings is no longer zero but possesses a component in one or the other direction. When recording the signals, care is to be taken to avoid as much as possible a direct-flux magnetization that may cause disturbing hum in the reproduction. If desired, conventional auxiliary expedients are applicable to minimize or eliminate hum effects.

If the control signals are to be recorded on the same track as the main signals and it is desired to fully utilize the control range of the magnetizable track, particular expedients must be resorted to for preventing the total signal variation from exceeding the available range of control. This can be done, for example, by reducing the control range of the alternating-current main signals by approximately 10%. Such reduction does not appreciably reduce the high degree of intensity variation available for the main signals, and the remaining 10% of controllability can then be utilized for the direct-flux magnetization to be superimposed upon the main signals. The just-mentioned expedient of slightly minimizing the control range of the main signals for permitting the auxiliary signals to be recorded on the same track, is generally sufficient for control and regulating purposes, and does not appreciably reduce the signal-to-noise level so that no appreciable hum disturbance is to be expected.

The foregoing and other objects, advantages and features of our invention, said features being set forth with particularity in the claims annexed hereto, will be apparent from, and will be mentioned in, the following with reference to the embodiments of devices according to the invention illustrated by way of example on the accompanying drawings, in which:

Figures 2, 3A, 3B, 4:
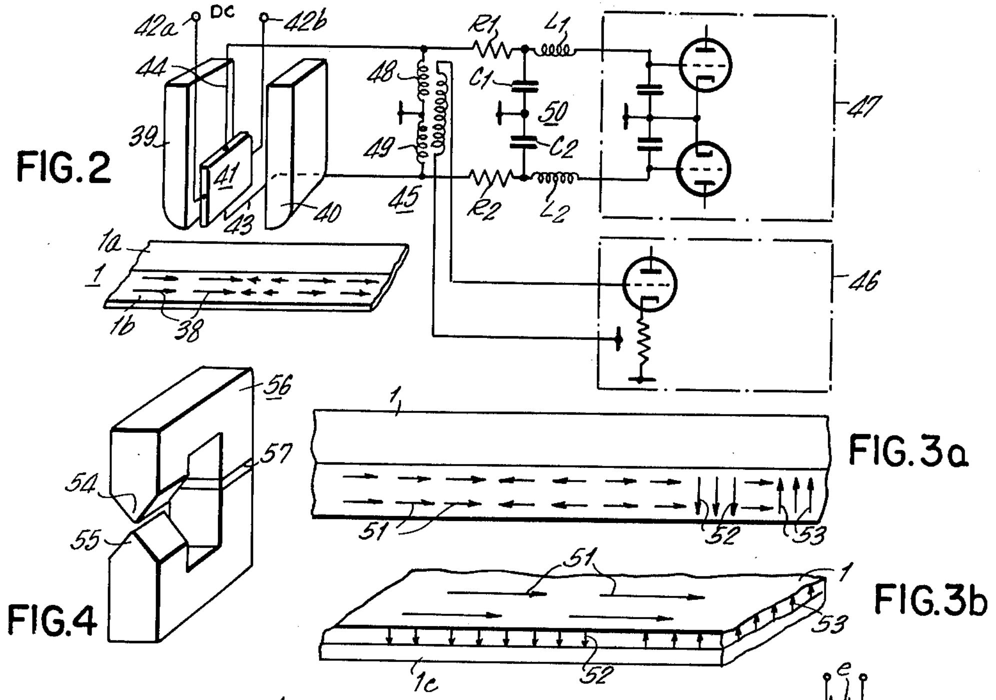
FIG. 2 shows a record tape together with the circuit diagram of reproducing components.
Figure 3C:
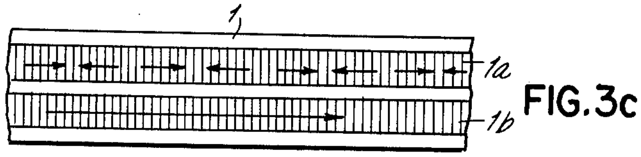

FIGS. 3*a*, 3*b* and 3*c* shows schematically three recording tapes with respectively different types of signal tracks.

FIG. 4 is a perspective view of a reproducing transducer.

Figure 5:
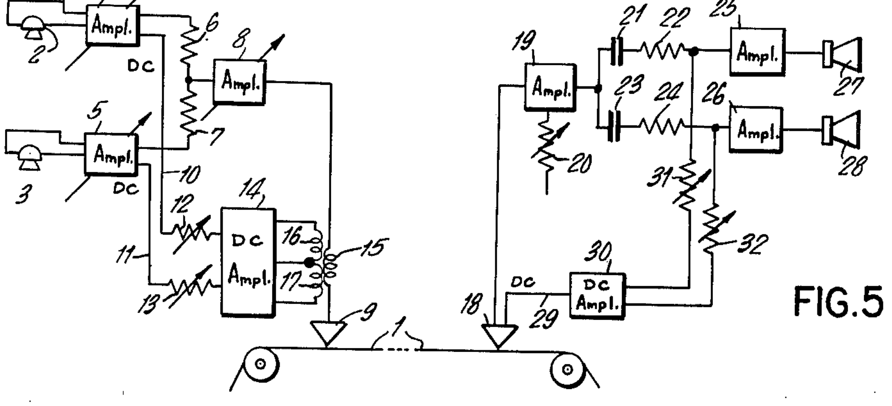

FIG. 5 shows schematically the circuit diagram of a pseudo-stereophonic recording and reproducing apparatus.

Figure 6:
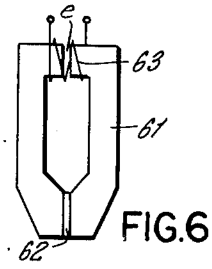

FIG. 6 shows schematically a lateral view of a combined Hall-voltage and inductive transducer.

Figure 7:
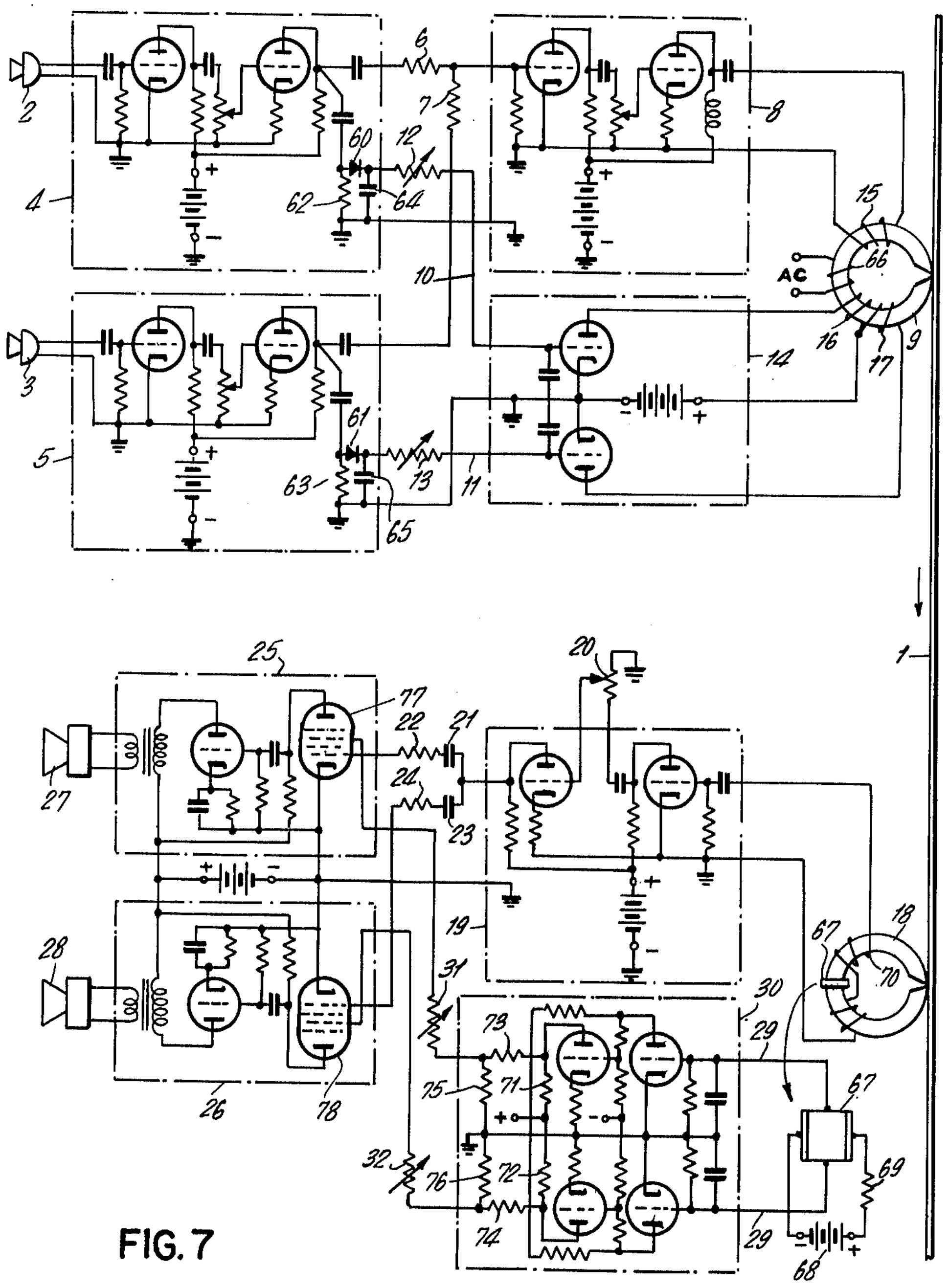

FIG. 7 is a detailed circuit diagram of a recording and reproducing system of the type shown in FIG. 5.

Figure 1:
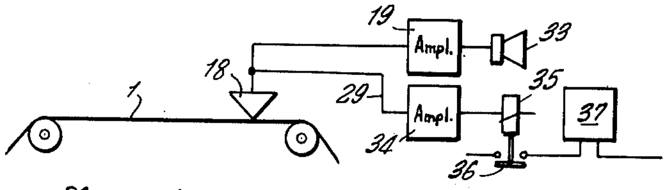
FIG. 1 is an explanatory diagram relating to the principles of the invention.

According to FIG. 1, a magnetic recording tape 1 or similar magnetogram carrier travels over guide rollers along a reproducing transducer head 18. The transducer head 18 is provided with a Hall plate and hence is capable of responding to control signals that are constituted by individually unidirectional magnetizations of the carrier 1, as will be more fully explained below with reference to FIG. 2. The tape 1 also carries a track of main signals, for example a sound track, to which the transducer head 18 is also responsive. The output voltage of transducer 18 thus has an alternating-voltage component corresponding to the main signals and a direct-voltage component corresponding to the auxiliary signals, the latter component having one or the other direction depending upon the magnetic polarization of the particular auxiliary signal responded to at a time. The main signals are supplied in conventional manner to an amplifier 19 which operates a loudspeaker 33 or other electroacoustic transmitter. The direct-voltage component issuing from the Hall plate of the transducer head passes through a separate channel 29 to a direct-current amplifier 34 whose output is applied to a relay 35. If desired, the two amlifiers 19 and 34 may be combined to a single unit.

The alternating-current signals to be amplified by amplifier 19 may also be fully or partially obtained from a second transducer of the conventional inductive type. Another way is to provide the magnetizable core structure 61 (FIG. 6) of the transducer head 18 not only with a Hall plate 62 for connection to amplifier 34, but also an inductance winding 63 for providing the alternating voltage for amplifier 19. Furthermore, two separate transducer heads may be provided of which each is designed as a Hall-voltage generator.

The relay 35 in FIG. 1 is shown to be of the electromagnetic type. When the relay 35 is energized by response of transducer 18 to a suitable auxiliary signal, it closes a contact 36 which energizes a device 37 which may serve, for example, to switch a slide projector, or to synchronize simultaneously occurring electrical acoustical, optical or mechanical operations. In a similar manner the device 37 may also serve to transmit measuring values in response to the auxiliary control signals.

The embodiment illustrated in FIG. 2 will exemplify how the direct-current component of the voltage supplied from the Hall-voltage transducer is utilized in the reproducer circuitry in accordance with magnitude and polarization of the individual control signals. The magnetogram carrier 1 is again represented as a magnetic recording tape which in this case is provided with two parallel sound tracks 1*a*, 1*b* of which only one is used at a time. The magnetic recordings on track 1*b* are symbolically illustrated by arrows 38 which change their direction in accordance with the alternating-current main signal. In order to include a direct-flux component in the recording, the arrows are shown longer in one direction than in the other. In this manner, the illustrated portion of the magnetogram, represents an auxiliary control signal recorded on the same track as the alternating-current main signal in form of a direct-flux component superimposed upon the alternating flux of the main signal.

The essential components of the transducer head (18 in FIG. 1) are shown in FIG. 2 exploded for the purpose of showing the Hall plate 41. The Hall plate 41 consists of semiconducting material of a high carrier mobility, preferably above 10,000 cm.$^2$/volt second. Particularly suitable for this purpose are crystalline wafers or coatings of indium arsenide (InAs) or indium antimonide (InSb). The Hall plate 41 is located between two pole plates 39, 40 consisting preferably of ferrite. The Hall plate 41 is in face-to-face contact with the adjacent surfaces of the two plates, and the gap between the two plates, corresponding to the thickness of the Hall plate, is extremely small, such as less than 4 microns and preferably about 1 micron. Such narrow gaps are obtained, for example, by depositing the Hall plate material from the vaporous phase upon the gap surface of one of the plates 39, 40. The Hall plate 41 is provided with two line-shaped terminal electrodes that extend over the entire length of two mutually opposite edges and are connected to respective output terminals 42*a* and 42*b*. During operation, these terminals are connected to a source of energizing current, such as a direct-current source of constant voltage. The Hall plate 41 is further provided with two probe electrodes (Hall electrodes) on the respective two other edges of the Hall plate midway between the above-mentioned two terminal electrodes. The Hall electrodes are connected to respective output leads 43 and 44.

When the plate 41 is energized by current passing through the terminals 42*a*, 42*b*, the field of the magnetic signals on tape 1 causes a Hall voltage to appear between the output leads 43 and 44. The Hall voltage has an alternating-voltage component to which a direct-voltage component is superimposed as explained above. The alternating-voltage component constitutes the main signals to be reproduced, for example, by a loudspeaker. These main signals are supplied through a transformer 45 to an alternating-current amplifier 46 of which only the input stage is schematically illustrated. The direct-voltage component of the pickup voltage is amplified in a direct-current amplifier 47. In order to respond to the direct-voltage component as to magnitude and direction, the transformer 45 is provided with two symmetrical primary windings 48 and 49 which have a common secondary winding connected to the alternating-current amplifier 46. The direct-voltage component is supplied to the input stage of the direct-current amplifier 47 through a network 50, comprising resistors R1, R2, inductance coils L1, L2 and capacitors C1, C2. The network prevents the direct-current amplifier 47 from responding to the instantaneous voltage value so that this amplifier acts only upon slow voltage changes.

It will be understood that the amplifier 46 (FIG. 2) is connected with the main electroacoustic or other receiver, such as the loudspeaker 33 shown in FIG. 1, whereas the direct-current amplifier 47 (FIG. 2) has its output applied to a relay or other device to be controlled in dependence upon the auxiliary control signals, such as the relay 35 shown in FIG. 1.

The invention thus affords the possibility of utilizing the direct-flux component for transmitting a variety of control commands, in addition to sensing and reproducing the main signals. For example, when reproducing a sonic record, the control signals may serve for controlling the dynamics of the electroacoustic reproduction in such a manner that a magnetic signal of increased intensity controls the reproducing amplifier to increase the volume of the sound being reproduced. The auxiliary direct-flux signals may also serve to switch accessory devices on and off. For example, when projecting picture slides onto a screen while an accompanying sound track is being reproduced, the exchange of the picture slides can be effected by having the direct-flux magnetization of the magnetogram control the necessary switching operation. Synchronizing signals of this kind may also be provided in presentation of moving pictures from standard or narrow films. The invention further affords a stereophonic control, and may be used for the purpose of a pseudo- stereophonic representation of sound recorded on a single track. For this purpose, the direct-voltage component of the reproducing transducer voltage can be utilized not only in dependence upon its magnitude but simultaneously in dependence upon its direction or polarity. For this purpose, the volume of sound issuing from two loudspeakers or groups of loudspeakers, correlated to the right and left ears respectively, can be controlled by correspondingly utilizing the direct-flux control signals in dependence upon their direction of magnetization. The invention is also applicable in the field of measuring techniques where, in addition to the measuring values magnetically recorded on the tape or other carrier, additional synchronizing pulses, timing pulses, or other auxiliary signals are to be recorded and reproduced.

The direct-flux magnetizations of the carrier that constitute the control signals may also extend in a direction other than that of the main signals, or they may be recorded on a separate signal track. Thus, according to FIG. 3*a*, showing a recording tape 1 with two sound tracks of which only one is used at a time, the magnetizations constituting the main signals, schematically represented by arrows 51, extend in the conventional manner longitudinally, that is in the traveling direction of the tape. The respectively different directions of the main-signal arrows 51 denotes their alternating-flux character as produced by alternating-currrent signals. In addition to these main signals the same sound track, according to FIG. 3*a*, is provided with auxiliary magnetizations, schematically represented by arrows 52 and 53, that extend transverse to the travel direction in the plane of the tape. As apparent, the auxiliary signals need not all have the same direction of polarization but may occur in both directions if the receiving amplifier or receiving device is to respond differently, depending upon whether a control signal of one or the other polarity is being sensed at a time by a two-channel amplifier such as the one denoted by 47 in FIG. 2.

While according to FIG. 3*a* the control signals can be recorded in the plane of the magnetogram carrier at an angle, preferably perpendicularly, to the main-signal recordings, the auxiliary-signal magnetizations may also extend in depth, that is in the thickness direction of the carrier. Thus, in FIG. 3*b* the main signals 51 extend in the longitudinal or travelling direction of the tape 1, whereas the auxiliary signals 52 and 53 are magnetized in the direction of depth of the magnetizable coating carried by the non-magnetizable body 1*c* of the tape.

According to FIG. 3*c*, the main signals and the control signals are recorded on separate tracks of the tape 1. The track 1*a* comprises the alternating-flux main signals, and the track 1*b* is provided with a number of individual direct-flux magnetizations, of which one is represented by a relatively long arrow.

The transducer head illustrated in FIG. 4 is particularly designed for response to control signals that according to FIG. 3*b* extend from the topside through the magnetizable coating to the rear of the magnetogram. The transducer has a magnetizable core system 56 whose pole shoes 54 and 55 taper toward each other and form respective knife edges. The gap between these edges is sufficiently wide to let the recording tape pass through without touching the edges. The core has a gap in which a Hall plate 57 is located. The circuit connections and the operation of the Hall plate are as described above with reference to the Hall plate 41 in FIG. 2. The use of knife-edge pole shoes afford substantially the same advantageous reproducing performance as can be obtained with conventional reproducing transducers only if extremely narrow air gaps are used.

For recording depth-oriented signals as explained above with reference to FIG. 3*b*, an inductive transducer may be used whose magnetizable core structure corresponds to that of the reproducing transducer shown in FIG. 4, except that the Hall plate and the plate-receiving gap are omitted and a magnetizing coil is mounted on the core.

When providing a reproducing transducer for the control signals according to FIG. 4, the second reproducing channel for response to the main signals requires the simultaneous application of another transducer capable of responding to the alternating-flux track in the plane of the tape. If the main signals are magnetized in the longitudinal direction of the tape, as exemplified by FIGS. 2 and 3*a* to 3*c*, the second transducer channel must have an air gap extending transverse to the magnetizing direction of the main signals. Such a transducer channel may be provided by using a second transducer head of the conventional, inductive type. However, the alternating-flux main signals may also be reproduced by means of another transducer head of the Hall-voltage generating type. Thus, a transducer as described above with reference to FIGS. 2 or 4 may be employed for response to the main signals. Furthermore, a single transducer head may combine a Hall-voltage generator with an inductive pickup system as exemplified by the transducer head illustrated in FIG. 6 and partly described above. The structure 61 preferably consists of two ferrite members, which forms two gaps. The Hall plate 62 is mounted in the gap immediately adjacent to the magnetogram carrier, whereas the induction coil 63 is at the second gap. The reproducing channel for the control signals is to be connected to the Hall plate 62 as described with reference to FIG. 2, and the channel for reproducing the main signals is connected to the coil 63.

FIG. 5 illustrates schematically a complete system utilizing the invention for pseudo-stereophonic reproduction of a sound track from a recording tape or similar magnetogram carrier. The carrier, illustrated as a tape 1 which travels at constant speed over guide rollers, is provided with a single sound track by means of an inductive transducer 9 in the manner conventional for monophonic sound recordings. However, as will be explained, the reproduction of this single sound track is such as to distribute the signal contents onto two electroacoustic receivers or loudspeakers that are to be spaced from each other to act predominantly upon the right and the left ears respectively for conveying a stereophonic impression.

The sound to be recorded is sensed by two microphones 2, 3 or two groups of microphones as conventional for two-channel stereophonic transmission. The two microphones act upon separate amplifiers 4 and 5, whose gain or amplification factor, preferably, is adjustable, this being indicated by respective arrows. The output voltages of the two amplifiers 4 and 5 are decoupled from each other, for example as schematically shown by respective resistors 6, 7 and are applied in parallel relation to each other to the input stage of an amplifier 8. The amplifier 8, whose amplification may likewise be adjustable, acts in conventional manner upon a recording head 9 for impressing the signals upon the travelling tape 1. A high-frequency pre-magnetization of the recording transducer may be employed in the conventional manner.

The two amplifiers 4 and 5, aside from furnishing the alternating tone-frequency output for recording the sound track proper, are designed to additionally furnish alternating or direct voltages whose magnitude depends upon the amplitude of the main signal. This can be done, for example, by providing one of the amplifier stages with a diode for rectifying the amplified alternating voltage, and impressing the rectified voltage upon respective direct-voltage output lines 10 and 11. The magnitude of the respective direct voltages in lines 10 and 11 correspond to the volume or intensity of the sound received by the microphones 2 and 3 respectively. These two voltages are applied through suitable, adjustable damping and decoupling members 12 and 13, here shown as adjustable rheostats, to a direct-voltage amplifier 14 which separately amplifies the two input voltages. If desired of course, the two-channel amplifier 14 may be substituted by two separate amplifiers operating in parallel and correlated to the respective two channels. The output circuits are connected to respective windings 16 and 17 of a magnetizing coil 15 on the magnetizable core system of the recording transducer 9. The coil 15 is energized from the main-signal amplifier 8. The two windings 16 and 17 are connected in voltage opposition so that their respective direct voltages tend to mutually cancel their magnetizing effects. For this purpose, the windings 16 and 17 have a common intermediate tap connected to a neutral pole of the amplifier 14.

When the intensities of the sound being received by the two microphones 2 and 3 are equal, the currents passing through the two windings 16 and 17 are also equal and, since their effects cancel each other, they do not impose a resultant magnetization upon the reproducing transducer. However, when one of the two microphones, for example the microphone 2, receives sound of greater intensity than the microphone 3, the amplifier output channel 10 supplies a higher direct voltage than the channel 11 so that more direct current flows through winding 16 than through winding 17. The difference of the two magnetizing currents imposes upon the transducer a polarized magnetization with the effect of impressing a corresponding component direct-flux magnetization upon the tape 1, thus augmenting the alternating main-signal magnetization in a given preferred direction. On the other hand, when the microphone 3 receives sound of greater intensity than microphone 2, the resultant magnetization of the recorded signals will be preponderant in the other direction. As a result, the sound track assumes the characteristic explained above with reference to sound track 1*b* in FIG. 2. That is, the carrier 1 is provided with a record, which, aside from the main signal proper, possesses a magnetic direct-flux component which at one time has a positive, at another time a negative direction, or which at other times may have completely vanished.

The superimposed direct-flux magnetization is so utilized in the reproducing equipment that a predominant magnetization in a given flux direction controls the amplication of an amplifier correlated to the right ear, in inverse relation to the amplification of the reproducing channel or amplifier correlated to the left ear, and vice versa. When a direct-flux magnetization is absent, a substantially uniform distribution upon the two transmission channels or amplifiers for the right and left ears is brought about.

For this purpose, the reproducing transducer head 18 comprises a Hall-voltage generator, such as described above, for response to the direct-flux control signals. The same or another Hall plate in the transducer may also be used for response to the alternating-flux main signals. However, the transducer assembly may also be provided with an inductive transducer of conventional type, or with a combined Hall-voltage and inductive transducer such as the one described above with reference to FIG. 6. The main signals are supplied from transducer assembly 18 in the conventional manner to an alternating-voltage amplifier 19 whose gain or amplification can be varied, this being represented schematically by a variable resistor 20. From amplifier 19, the amplified signals pass through separate channels to two power amplifiers 25 and 26. The two input circuits of amplifiers 25 and 26 are decoupled from each other by suitable decoupling members represented by capacitors 21, 23 and resistors 22, 24. The amplifiers 25 and 26 operate on respective loudspeakers 27 and 28 or other electroacoustic receivers correlated to the right and left ear respectively.

As mentioned, the gain of amplifiers 25 and 26 is to be controlled by the control signals. For this purpose, the Hall direct voltage is supplied from transducer head 18 through a channel 29 to a direct-voltage amplifier 30 where it is active in dependence upon its direction and magnitude, this amplifier corresponding to the one denoted by 47 in FIG. 2. The output currents from amplifier 30 in FIG. 5 act in the sense of variable damping (attenuation) members upon the respective input circuits of the power-stage amplifiers 25 and 26. The degree of control is variable within certain limits by means of adjustable resistors 31 and 32. The control can readily be so adjusted that when one of the transmission channels 25, 27 or 26, 28 is set for maximum or unimpeded amplification, the other system is reduced to minimum or zero amplification. The individual amplifiers 25, 26 and 30, if desired, can be combined with each other and may form a single unit.

As a result, the reproduction is pseudo-stereophonic, creating substantially the same impression as a two-channel stereophonic recording.

The recording and reproducing apparatus illustrated in detail in FIG. 7 embodies the principles explained above with reference to FIG. 5, the same reference numerals being applied to corresponding components respectively.

The recording portion has its two microphones 2, 3 connected with the respective pre-amplifiers 4 and 5. A portion of the amplified low-frequency voltage at the exit of the last stage in each amplifier is rectified by a dry-rectifier diode 60 or 61 which is connected in series with a resistor 62 or 63. Smoothing capacitors 64, 65 are connected parallel to respective resistors 62, 63. The two control voltages thus obtained are amplified by the push-pull direct-voltage amplifier 14 whose output voltages are impressed upon the respective direct-current magnetizing windings 16 and 17 of the recording head 9.

The sonic amplifier 8 proper is a conventional two-stage low-frequency amplifier. Its output circuit is connected to the alternating-current main winding 16 of the recording head 9. The magnetizable core of head 9 is provided with another winding 66 for superimposing high-frequency magnetization.

The reproducing portion of the apparatus in FIG. 7 is provided with a transducer head 18 equipped with a Hall plate 67 and with an induction winding 70, the Hall plate 67 being also shown separately from head 9 in order to illustrate its energizing circuit and its Hall-electrode circuit. The inductively generated voltage of winding 70 is pre-amplified in conventional manner by the low-frequency amplifier 19 to which the two power amplifier stages 25 and 26 for respective loudspeakers 27 and 28 are connected as explained above with reference to FIG. 5.

The Hall plate 67 is energized from a direct-current source 68 of constant voltage through a resistor 69. The Hall-electrode circuit is connected to a two-stage push-pull amplifier 30 whose output stages supply two direct voltages of respective magnitudes depending upon the direct-flux signals on the recording tape 1. The output stages comprise respective high-ohmic load resistors 71, 72, for example of 1 megohm. Connected to the load resistors is a voltage divider comprising longitudinal resistors 73, 74, for example of 5 megohms, and transverse resistors 75, 76 of about 2 megohms, the common mid-point of the resistors 75, 76 being grounded or connected to the chassis. Two tap leads are connected through the variable gain-control resistors 31 and 32 with the respective control grids of two hexodes 77, 78 in the respective first stages of amplifiers 25 and 26. Thus, the two direct voltages tapped off from the voltage divider determine the respective control grid voltages for tubes 77 and 78. The voltage divider circuit has the effect that a quiescent voltage in the vicinity of the grid bias zero value is present. Consequently, when the voltage from amplifier 30 decreases, the corresponding one hexode 77 or 78 is cut off, whereas analogously an increase in positive grid voltage causes the corresponding other tube to be fully turned on.

We claim:

1. The method of recording and reproducing sound with the aid of a travelling magnetogram carrier, which comprises translating sound in two channels into respective transmitter voltages and recording them magnetically and mutually superimposed on a single sound track of the carrier, additionally magnetizing the carrier by direct-flux signals of reversible polarity in accordance with the magnitude and direction of the difference between said two transmitter voltages; separately transducing from said sound track two receiver voltages and translating them into reproduced sound at separate locations, transducing from the direct-flux magnetization of the carrier a reversible direct voltage, and inversely controlling the volume of reproduced sound at said respective locations in dependence upon said direct voltage.

2. Apparatus for simultaneously reproducing alternating-flux and direct-flux signals from a travelling magnetogram carrier, comprising carrier guide means defining a travel path for the carrier, a transducer head having a magnetizable structure with a field gap located near said path, said transducer head having Hall voltage-generating sensing means responsive to said alternating-flux signals and said direct-flux signals so as to provide alternating and direct output voltages respectively, two amplifying channels connected to the alternating output voltage generating means of said transducer head and to the direct output voltage generating means of said transducer head respectively, and two receiving means connected to said respective amplifying channels for separate response to said alternating-flux signals and said direct-flux signals.

3. In reproducing apparatus according to claim 2, and further comprising a Hall-voltage output circuit in which said alternating voltage and said direct voltage are mutually superimposed, and filter means connected between said output circuit and said two amplifying channels for separating said alternating voltage from said direct voltage.

4. In reproducing apparatus according to claim 2, said amplifier connected to said direct voltage having two channels responsive to respectively different polarities of said direct voltage.

5. Apparatus for simultaneously reproducing signals previously applied to a travelling magnetogram carrier by alternating current and by direct current, comprising carrier guide means defining a travel path for the carrier, a transducer head having a magnetizable structure with a field gap located near said path, said transducer head having voltage-generating sensing means responsive to said alternating-current produced signals and said direct-current produced signals so as to provide alternating and direct output voltages respectively, main signal receiving means connected to the alternating output voltage generating means of said transducer head and comprising a variable-gain amplifier, and auxiliary signal receiving means connected to said direct output voltage generating means of said transducer head and having control means connected with said amplifier for controlling its gain in dependence upon said direct-current produced signals.

6. Apparatus for simultaneously reproducing alternating-flux and direct-flux signals from a travelling magnetogram carrier, comprising carrier guide means defining a travel path for the carrier, a transducer head having a magnetizable structure with a field gap located near said path, said transducer head having voltage-generating sensing means responsive to said alternating-flux signals and said direct-flux signals so as to provide alternating and direct output voltages respectively, main signal receiving means having an electroacoustic transmitter connected to the alternating output voltage generating means of said transducer head and having volume control means for varying the volume of sound being transmitted, and auxiliary signal receiving means connected to the direct output voltage generating means of said transducer head and having an output circuit connected to said volume control means whereby said volume is varied under control by said direct-flux signals.

7. Reproducing apparatus according to claim 2, wherein said receiving means connected to said direct output voltage generating means of said transducer head comprises a switch to be switched on and off under control by said direct-flux signals.

8. Reproducing apparatus according to claim 2, wherein said receiving means connected to said alternating output voltage generating means of said transducer head comprises two loudspeakers and respective volume control means connected to said loudspeakers, said other receiving means being connected to said two volume control means for inversely varying the volume in dependence upon the direct-flux signals.

9. Apparatus for pseudo-stereophonically recording sound, comprising binaural sound-to-voltage translating means having respective alternating-voltage channels, means for guiding a magnetogram carrier and defining a given path therefor, a recording transducer assembly located near said path for magnetically impressing signals upon said carrier, said transducer assembly having alternating-current magnetizing means and direct-current magnetizing means, said alternating-current magnetizing means being connected to said two alternating-voltage channels for producing therefrom a single sound track on the carrier, circuit means connected to said two channels and having a direct-current output dependent upon the difference in volume between the sound received by said respective binaural translating means, whereby said transducer assembly additionally magnetizes the carrier by direct-flux signals of reversible polarity.

10. Apparatus for pseudo-stereophonically reproducing sound from a magnetogram carrier having a sound track of alternating-flux signals and having additional direct-flux signals, comprising means for guiding the magnetogram carrier and defining a given path therefor, a transducer assembly located near said path and responsive to the alternating-flux signals and the direct-flux signals of the carrier, said transducer assembly having two output circuits for respective transducer voltages corresponding to said alternating-flux and direct-flux signals respectively, two sound reproducing circuits connected to said alternating-flux responsive transducer voltage and comprising respective sound-volume control means, said volume control means being connected to said direct-flux responsive transducer voltage for mutually inverse volume control of said respective sound reproducing circuits in dependence upon the magnitude and polarity of the direct-flux signal being reproduced at a time.

11. The method of recording and reproducing magnetograms which comprises passing a magnetizable carrier past a transducer having an electric input, simultaneously applying to the transducer a composite electrical signal comprising alternating-current information and direct-current control signals, passing said carrier past a Hall-voltage generator to detect the composite signal, separating the resulting direct voltage component from the alternating voltage component and separately applying the two components to two output channels.

(References on following page)

References Cited by the Examiner

UNITED STATES PATENTS

| | | | |
|---|---|---|---|
| 2,078,357 | 4/37 | Woodmansee et al. | 179—100.2 |
| 2,694,111 | 11/54 | Rettinger et al. | 179—100.2 |
| 2,697,754 | 12/54 | Ranger | 179—100.2 |
| 2,714,633 | 8/55 | Fine | 179—100.1 |
| 2,734,948 | 2/56 | Mueller | 179—100.2 |
| 2,828,368 | 3/58 | Wiegand | 179—100.2 |
| 2,832,839 | 4/58 | Muffly | 179—100.2 |
| 2,849,543 | 8/58 | Wiegand | 179—100.2 |
| 2,912,521 | 11/59 | De Niet et al. | 179—100.2 |

IRVING L. SRAGOW, *Primary Examiner.*

ROBERT H. ROSE, BERNARD KONICK, *Examiners.*